(12) United States Patent
McAndrew et al.

(10) Patent No.: US 6,536,825 B2
(45) Date of Patent: Mar. 25, 2003

(54) CONTROL PANEL FOR A VEHICLE

(75) Inventors: Tim McAndrew, Grosse Ile, MI (US); Robert M. Schmidt, Livonia, MI (US); Paul C. Babcock, Bloomfield Hills, MI (US); Richard Williams, Dexter, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/848,722

(22) Filed: May 3, 2001

(65) Prior Publication Data

US 2001/0052715 A1 Dec. 20, 2001

Related U.S. Application Data

(60) Provisional application No. 60/202,588, filed on May 9, 2000.

(51) Int. Cl.[7] .............................. B60J 5/04; B60R 11/02
(52) U.S. Cl. ............................... 296/37.13; 296/146.7; 296/153; 296/37.8; 296/24.1; 180/315; 180/326; 180/334
(58) Field of Search ............................. 296/37.1, 37.8, 296/37.13, 146.1, 146.7, 153, 37.12, 24.1; 180/315, 334, 335, 326

(56) References Cited

U.S. PATENT DOCUMENTS

| | | | |
|---|---|---|---|
| 4,165,898 A | | 8/1979 | Janz et al. |
| 4,190,284 A | | 2/1980 | Schmidhuber et al. |
| 4,453,760 A | * | 6/1984 | Hira ........................ 296/37.13 |
| 4,473,724 A | | 9/1984 | Suzuki |
| 5,286,078 A | * | 2/1994 | Mottino et al. ............. 296/153 |
| 5,294,758 A | | 3/1994 | Frankhouse et al. |
| 5,522,638 A | * | 6/1996 | Falcoff et al. ............. 296/37.8 |
| 5,557,080 A | | 9/1996 | Hayakawa |
| 5,887,669 A | * | 3/1999 | Ostler et al. ................ 180/53.4 |
| 5,921,610 A | | 7/1999 | Grimes |
| 5,924,515 A | * | 7/1999 | Stauffer ....................... 180/326 |
| 5,952,630 A | * | 9/1999 | Filion et al. ................. 296/153 |
| 6,003,925 A | * | 12/1999 | Kitke et al. ................. 296/37.8 |
| 6,086,129 A | * | 7/2000 | Gray ........................... 296/37.8 |
| 6,116,672 A | * | 9/2000 | Cannon et al. ........... 296/37.13 |
| 6,125,030 A | * | 9/2000 | Mola et al. ................. 296/37.8 |
| 6,126,221 A | * | 10/2000 | Kern ........................... 296/37.7 |
| 6,158,795 A | * | 12/2000 | Gray et al. ................. 296/37.8 |
| 6,176,534 B1 | * | 1/2001 | Duncan ..................... 296/37.12 |

FOREIGN PATENT DOCUMENTS

| | | |
|---|---|---|
| DE | 34 45 891 | 6/1986 |
| DE | 37 19 105 | 12/1988 |
| EP | 084107 | 7/1983 |
| EP | 114959 | 8/1984 |
| FR | 2391681 | 12/1978 |
| FR | 2391871 | 12/1978 |
| JP | 90/09127 | 8/1990 |

OTHER PUBLICATIONS

Automotive Industries, Sep. 2001 issue; article entitled "Process of Elimination" by Gerry Kobe starting on p. 29; see specifically p. 31, navigation unit.

* cited by examiner

*Primary Examiner*—D. Glenn Dayoan
*Assistant Examiner*—Greg Blankenship
(74) *Attorney, Agent, or Firm*—MacMillan, Sobanski & Todd, LLC

(57) ABSTRACT

A control panel for a vehicle includes a housing defining a recess formed therein. A panel is movably attached to the housing and has at least one control mechanism mounted thereon. The panel is movable between a first position wherein the panel generally covers a portion of the recess, and a second position wherein the panel generally exposes the recess. Preferably, the housing defines a first surface within the recess, and a second control mechanism is mounted on the first surface.

14 Claims, 4 Drawing Sheets

CONTROL PANEL FOR A VEHICLE

CROSS REFERENCE TO RELATED APPLICATIONS

This application claims the benefit of U.S. Provisional Application No. 60/202,588 filed May 9, 2000.

BACKGROUND OF THE INVENTION

This invention relates in general to electrical control panels for vehicles. Most all passenger vehicles are equipped with electrical components which are controllable by the occupants of the vehicle. The electrical components are controlled by the manual manipulation of control mechanisms, such as switches and rotary devices. The control mechanisms are mounted on various panels within the interior of the vehicle, such as the instrument panel, door panels, seats, center consoles, and overhead consoles. It is becoming increasingly more common to replace manually actuated components with electrically actuated components, such as for example, seat adjustment mechanisms, mirror adjustment mechanisms, door locks, window lifting devices, pedal adjustment mechanisms, and steering column adjustment mechanisms. Because of the increase in number of control mechanisms, the various areas surrounding the occupants, namely the driver of the vehicle, is becoming over crowded and sometimes confusing. The increased amount of control mechanisms also leads to the placement of some of the control mechanisms at undesirable locations where they might be difficult or cumbersome to reach.

SUMMARY OF THE INVENTION

This invention relates to a control panel for a vehicle interior. The control panel includes a housing defining a recess formed therein. A panel is movably attached to the housing, such as by a pivot. The panel has at least one control mechanism mounted thereon. The panel is movable between first and second positions. In the first position, the panel generally covers at least a portion of the recess. In the second position, the panel generally exposes the recess. Preferably, the housing defines a first surface within the recess, and a second control mechanism is mounted on the first surface.

Various objects and advantages of this invention will become apparent to those skilled in the art from the following detailed description of the preferred embodiment, when read in light of the accompanying drawings.

DETAILED DESCRIPTION OF THE INVENTION

Figure 1:
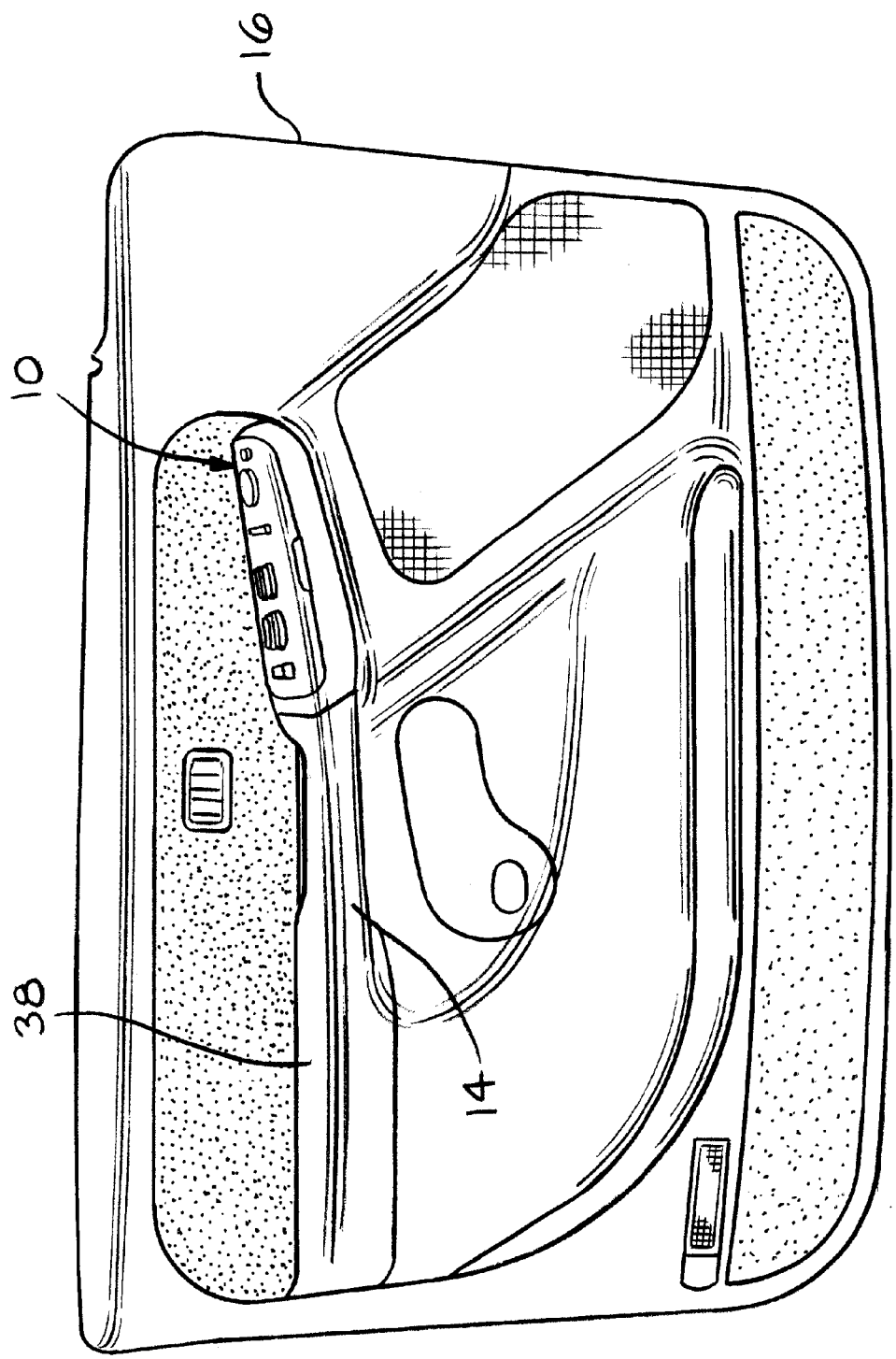
FIG. 1 is a side elevational view of a vehicle door panel having the control panel of the present invention mounted thereon.
Figure 2:
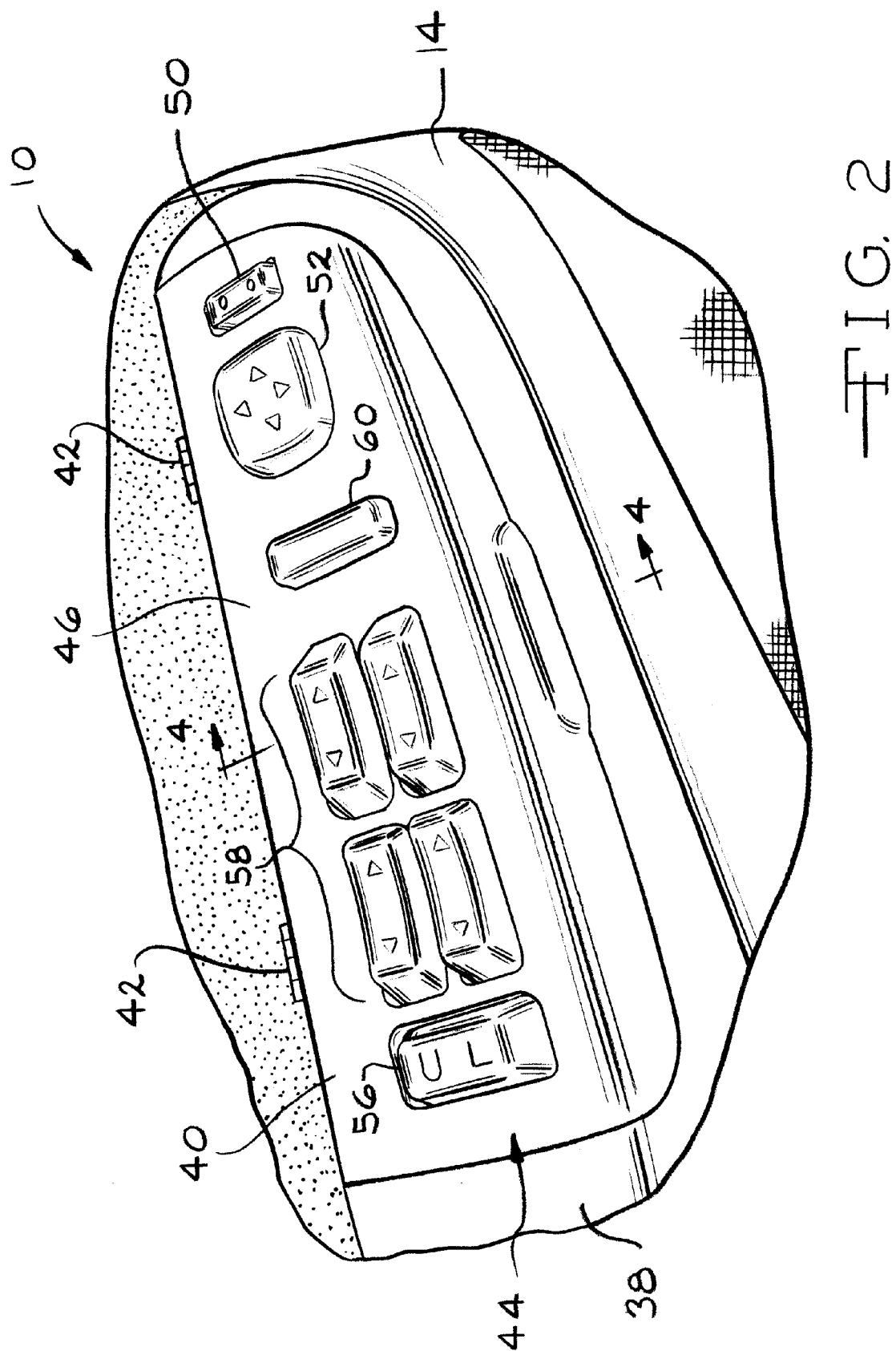
FIG. 2 is a perspective view of the control panel of FIG. 1, wherein the door panel is in its closed position.

Referring now to the drawings, there is illustrated in FIGS. 1 and 2 a control panel, indicated generally at 10, in accordance with the present invention. As will be described below, the control panel 10 includes a plurality of controls for controlling various electrical components or accessories of the vehicle, such as seats, mirrors, windows, door locks, pedal adjustment mechanisms, and steering column adjustment mechanisms.

Figure 3:
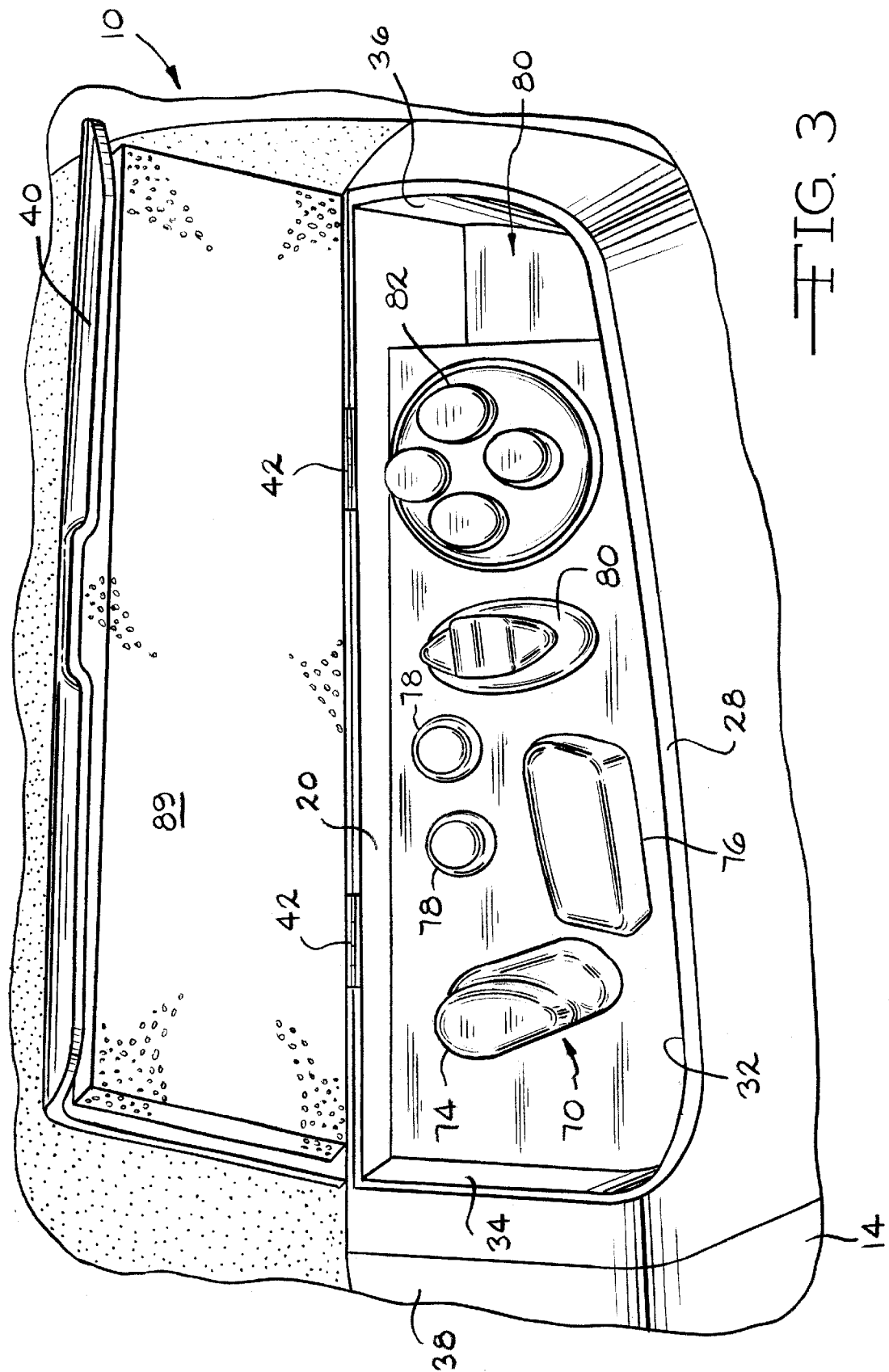
FIG. 3 is a perspective view of the control panel of FIG. 1, wherein the door panel is in its open position.

The control panel 10 is preferably located at a location which is convenient for the user or occupant of the vehicle. For example, the control panel 10 is preferably located and incorporated into an armrest 14 of a vehicle door trim panel 16, as best shown in FIGS. 1 through 3. Of course, the control panel 10 can be located anywhere within the interior, such as an instrument panel, center console, or overhead console.

Figure 4:
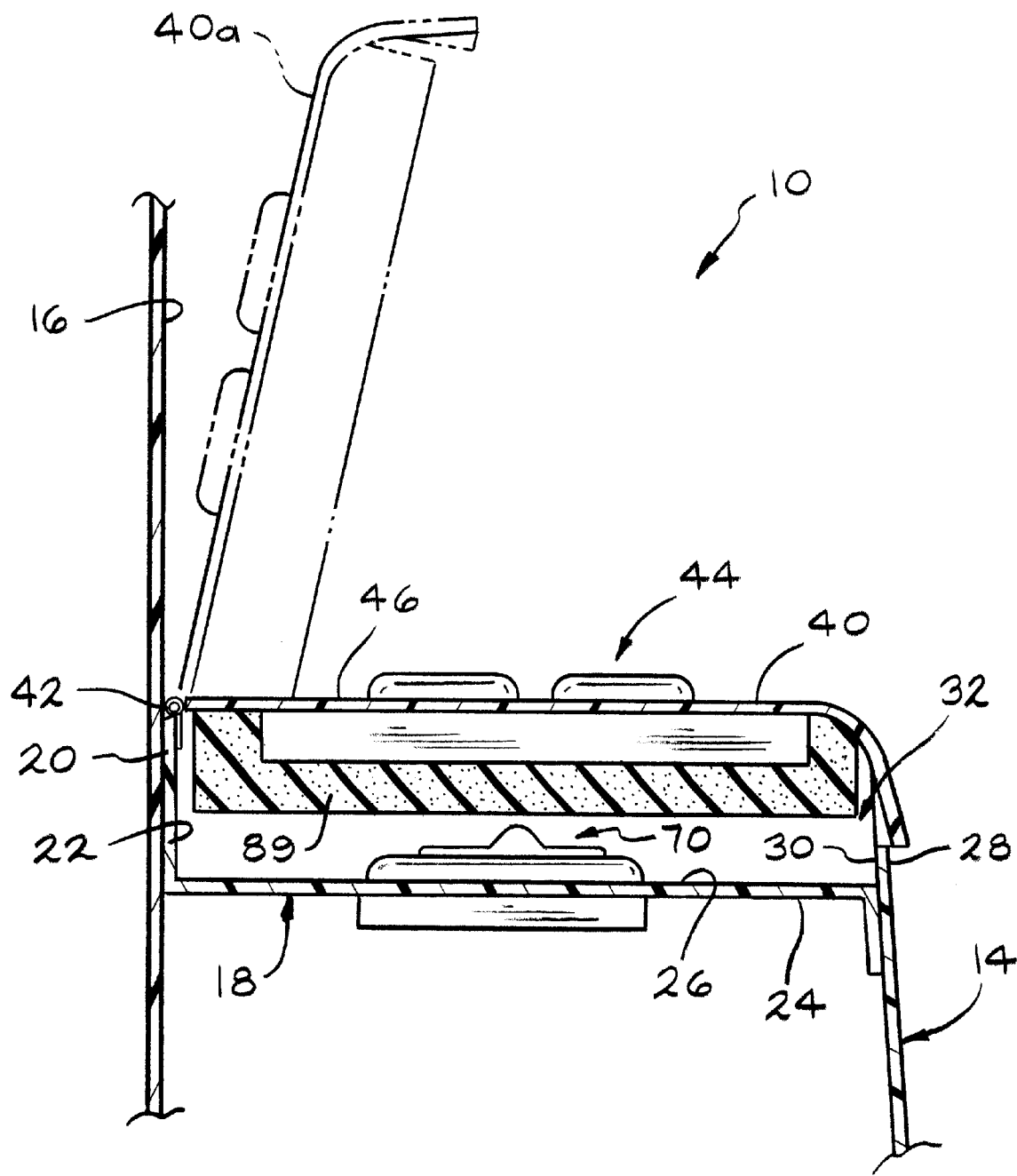
FIG. 4 is cross-sectional view of the control panel taken along Line 4—4 in FIG. 2.

The control panel generally includes a housing 18, as best shown in FIG. 4. The housing 18 can be any suitable structure for containing and mounting the components of the control panel 10. For example, the housing 18 can be integrally formed in the armrest 14 of the door trim panel 16. The housing 18 can be a separate module or can be integrally formed in an interior trim panel. As shown in FIG. 4, the housing 18 includes a generally vertical outboard panel 20 having an inner surface 22. The panel 20 can be separate or formed from part of the door trim panel 16. The housing 18 also includes a bottom panel 24 having a surface 26, and a generally vertical inboard panel 28 having an inner surface 30. The surfaces 22, 26, and 30 define a recess 32. The recess 32 is also defined by end walls 34 and 36, as shown in FIG. 3. The recess 32 can have any suitable shape, but preferably conforms to the shape of the armrest 14. The recess 32 is located underneath a top surface 38 of the armrest 14.

The control panel 10 further includes an access or door panel 40 which is movably mounted on the housing 18. Preferably, the door panel 40 is pivotally mounted on the housing 18 by one or more hinges 42. As best shown in FIG. 4, the hinges are mounted adjacent the outboard panel 20. Of course, the panel 40 can be pivotally mounted on the housing 18 by any suitable manner. The panel 40 is movable between a normally closed position, as shown in FIGS. 1 and 2, and an open position, as shown in FIGS. 3 and 4, as indicated by phantom lines 40a in FIG. 4. In the closed position, the panel 40 is positioned generally above and substantially closes off the open upper portion of the recess 32. Of course, the control panel 10 may be configured such that the panel 40 only partially covers the recess 32, for example, if the opening of the recess 32 is larger than the panel 40. In the open position, the panel 40 generally exposes the opening of the recess 32 to permit easy access to control mechanisms mounted therein which are normally hidden from view when the panel 40 is in its closed position, as will be explained below. Although the panel 40 is shown and described as being pivotally mounted on the housing 18, the panel 40 can be movably mounted by any suitable structure, such as be a sliding, rotating, or a rolling apparatus. Also, the panel 40 could be pivotally mounted at any suitable location, such as by hinges (not shown) mounted on the end wall 36 such that the panel flips forward instead of from the side, as shown in FIGS. 3 and 4.

The control panel 10 includes a first bank of control mechanisms or controls, indicated generally at 44, which are mounted on and extend upwardly from a top surface 46 of the panel 40. Preferably, the top surface 46 of the panel 40 is flush and generally co-planar with the surface 38 of the armrest 14. The controls mechanisms can be any suitable control mechanism, such as an electrical switch, button, slide, toggle, or rotary knob which controls a corresponding electrical components of the vehicle. The control mechanism can also be a mechanically actuated mechanisms such as a cable connected knob for controlling a side view mirror assembly (not shown).

Preferably, the first bank of controls 44 includes control mechanisms which are frequently used by the driver or passenger of the vehicle since the panel 40 is normally in its closed position. For example, the bank of controls 44 can include a side view mirror selection switch 50 (left and right) and a four way position control knob 52 for controlling the position of a side view mirror (not shown). The bank of switches 58, and a push button switch 60 for locking control of auxiliary power window switches.

As shown in FIGS. 3 and 4, the control panel 10 includes a second bank of controls, indicated generally at 70, which are mounted on the bottom panel 24 of the housing 18. If desired, the second bank of controls can be mounted on a separate module (not shown) which is installed in the recess 32. Similar to the first bank of controls 44, the second bank of controls 70 can include any suitable control mechanisms. Preferably, the second bank of controls 70 includes controls which are infrequently used by the driver or passenger of the vehicle since the panel 40 is normally in its closed position, thereby covering or hiding the second bank of controls 70. For example, the bank of controls 70 can include a seat recliner switch 74 and a six-way control switch 76 for controlling the fore, aft, and height adjustments of a powered seat. The second bank of controls 70 can also include a pair of switches 78 for controlling heated and/or cooled seats. Also, a selector switch 80 may be provided for selectively controlling a four-way switch 82, for controlling either the up/down/in/out motion of a seat lumbar support or the first/second/exit/set controls of a memory circuit for automatically actuating seats, mirrors, radio to preset positions, pedal adjustment mechanisms, and/or steering column adjustment mechanisms. Of course, the first and second banks of controls can have any other desirable controls.

The bank of controls 44 and 70 can be mounted on the panel 40 and bottom panel 24, respectively, by any suitable manner. Preferably, the controls 44 are wired by a flat flexible cable (not shown) which travels through or about the hinge point of the panel 40 with respect to the housing 18. Of course, the wiring can be routed by any suitable manner, such as through a hollow hinge member (not shown). The controls 44 and 70 can be connected with a multiplex bus wiring scheme or using a direct connection, but can be wired by any suitable manner.

The controls 44 and 70 can also be connected using radio frequency (RF) transmitters. The receiver can be a separate dedicated receiver for the controls 44 and 70 or an existing receiver for a remote keyless entry system (not shown) could be utilized. For example, due to possible wear problems with using wires for the controls 44 in the hinged door panel 40, it may be desirable to use RF transmitters.

One of the advantages of the control panel 10 is that all of the controls of the control panel 10 can be mounted at an ergonomically and convenient location at the forward portion of the armrest 14. By using the movable panel 40 to stack two layers of controls, a relatively large number of controls can be mounted in a relatively small and convenient area. Conventionally, the controls in the second bank of controls 70 are mounted at less desirable areas such as the lower portions of the seat or on the instrument panel. By providing more frequently used controls on the exposed surface 46 of the panel 40 when in its closed position, the user only has to open the panel 40 a generally infrequent number of times when the second bank Is of controls 40 are used.

The control panel 10 can also be configured so that a portion of the control mechanisms 44 are not independent switches but are movable knobs which when depressed or otherwise controlled, physically engage one of the controls 70 directly underneath. A separate indicator switch (not shown) can be installed between the panel 40 and the housing 18 to indicate whether the panel 40 is in its open or closed position.

The control panel 10 may also include a foam pad 89 mounted on the underside of panel 40 to protect the second bank of controls 70 if, for example, the panel 40 is depressed downward too far and hits the upper portions of the second bank of controls 70.

Although the control panel is shown and described as being horizontally mounted on the armrest 14, the control panel 10 could be mounted vertically, for example, on the door trim panel 12, with the panel 40 being movable to position to provide access the second bank of control 70.

The present invention also includes a method of installing the control panel 10 in a vehicle. The first step of installing the control panel 10 is to select a location in the vehicle interior which provides a convenient location for a user, such as the driver, to access a plurality of control mechanisms which operate various vehicle components. An example of a convenient location is on the armrest 14 of the door trim panel 12, as shown in FIG. 1. This location is generally convenient because of being in short reach and high visibility to the user. A primary set of control mechanisms and a secondary set of control mechanisms are then identified from the plurality of control mechanisms. For example, the primary set of control mechanisms can include one of more of the controls of the first bank of controls 44. The secondary set of control mechanisms can include one or more of the controls of the second bank of controls 70. Preferably, the primary set is identified by the relative frequent use of the control mechanisms. Generally, the controls 70 are used less frequently than the controls 44. The primary and secondary set of control mechanisms are then located and installed at the convenient location, such as mounting them in the armrest 14. The 40 panel is provided to cover the secondary set of control mechanisms. This covering provides an advantage of not cluttering up the location of the controls with many controls. When access is needed to the less frequently used secondary controls, the panel 40 can be moved to expose the secondary controls.

The recess 32 of the control panel 10 may also define a storage compartment 80 or coin/ashtray bin. The control panel 10 could also be configured without the second bank of control 70 for vehicles which do not include the accessories associated with the second bank of control 72 to provide a larger storage compartment. For example, a vehicle manufacture may assemble a vehicle having two or more option packages, wherein a first option package includes the first bank of controls 44 and the second bank of controls 70. The second option package may only include the first bank of controls 44 because the electrical components of all or some which are associated with the second bank of controls is not installed in the vehicle. It would be desirable to use at least a portion of the space within the recess 32 as a storage compartment if the second option package was installed in the vehicle. The storage compartment can be simply an open compartment or house another storage module, such as for example, a coin dispenser. For installation, the second bank of controls 70 can be housed in a single module (not shown) which is installed within the recess 32.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A control panel for a vehicle comprising:

a housing defining a recess formed therein;

a panel movably attached to said housing, said panel having at least one control mechanism mounted thereon, said panel movable between a first position, wherein said panel generally covers a portion of said recess, and a second position wherein said panel generally exposes said recess;

wherein said control panel is mounted on a vehicle door trim panel.

2. The control panel of claim 1, wherein said housing defines a first surface within said recess, and wherein the control panel further includes a second control mechanism mounted on said first surface, wherein said panel is movable to the second position to expose said second control mechanism.

3. The control panel of claim 2, wherein said first surface of said housing has a plurality of control mechanisms mounted thereon.

4. The control panel of claim 1, wherein a surface of said panel has a plurality of control mechanisms mounted thereon.

5. The control panel of claim 1, wherein said panel is pivotally attached to said housing.

6. The control panel of claim 1, wherein said panel substantially covers said recess when said panel is in said first position.

7. The control panel of claim 6, wherein said recess defines a storage compartment.

8. The control panel of claim 1, wherein said housing is integrally formed in an armrest of said vehicle door trim panel.

9. The control panel of claim 8, wherein said panel defines an upper surface of said armrest.

10. The control panel of claim 1, wherein said panel is generally horizontally oriented when in said first position.

11. The control panel of claim 1, wherein the housing has an upper surface including lateral edges, and wherein said recess is formed in said upper surface, said recess defines a perimeter formed in said upper surface which is spaced from said lateral edges.

12. The control panel of claim 11, wherein said recess is defined by generally vertical walls formed in said housing.

13. A vehicle control apparatus comprising:

a trim panel defining a recess formed therein;

a plurality of first control mechanisms mounted on a bottom surface of said recess;

a door panel pivotally attached to said trim panel, said panel having an outer surface; and a plurality of second control mechanisms mounted on said outer surface of said door panel;

wherein said door panel is pivotable between a first position wherein said panel substantially covers said recess, and a second position wherein said panel generally exposes said recess.

14. A method of manufacturing a vehicle comprising the steps of:

a. providing a vehicle having first and second option packages, wherein the first option package includes a first control mechanism and a second control mechanism, and the second option package includes the first control mechanism but not the second control mechanism;

b. providing a trim panel including a control panel defining a recess and a first surface, the control panel further including a door panel movably attached to the trim panel, the door panel being movable between a first position, wherein the door panel generally covers the recess, and a second position wherein the door panel generally exposes the recess;

c. selecting one of the first and second option packages; and d. installing the first and second control mechanisms according to the selected first and second option packages such that if the first option package is selected, the first control mechanism is installed on the door panel and the second control mechanism is installed on the first surface within the recess, and if the second option package is selected, the first control mechanism is installed on the door panel and the second control mechanism is not installed in the recess, thereby creating a storage compartment within the recess.

* * * * *